United States Patent [19]

Hesseler

[11] 4,168,179

[45] Sep. 18, 1979

[54] BITUMINOUS COMPOSITION

[75] Inventor: William F. Hesseler, Lebanon, N.J.

[73] Assignee: GAF Corporation, New York, N.Y.

[21] Appl. No.: 873,488

[22] Filed: Jan. 30, 1978

[51] Int. Cl.$^2$ ............................ C08K 3/04; C08K 7/14; C08L 95/00
[52] U.S. Cl. ................................. 106/278; 106/281 R; 106/282; 106/283; 106/DIG. 2
[58] Field of Search ................... 106/282, 278, 281 R, 106/283, DIG. 2

[56] References Cited

U.S. PATENT DOCUMENTS

| | | | |
|---|---|---|---|
| 2,178,770 | 3/1939 | Zaisser | 106/282 |
| 2,584,919 | 2/1952 | Pullar | 106/282 |
| 3,411,927 | 11/1968 | Brouk | 106/282 |
| 3,567,660 | 3/1971 | Winkler | 106/282 |
| 3,782,988 | 1/1974 | Alexander et al. | 106/282 |

Primary Examiner—J. Ziegler
Attorney, Agent, or Firm—Walter C. Kehm; Joshua J. Ward

[57] ABSTRACT

Asbestos-free bituminous composition comprising 1–3 wt% high-structure carbon black and 1 to 25 wt% expanded perlite dispersed in asphalt cutback. The composition also contains 0.5 to 5 wt% water.

5 Claims, No Drawings

BITUMINOUS COMPOSITION

BACKGROUND OF THE INVENTION

Bituminous compositions comprising asphalt cutback, asbestos fiber and particulate fillers such as limestone are well known in the roofing industry for use in caulking, flashing and as roofing cement and/or waterproofing agents in roofing applications. While such compositions are generally satisfactory in terms of providing satisfactory results, the asbestos fibers used in such compositions are known to be carcinogenic. Thus the manufacture of formulations containing asbestos fibers represents difficult safety problems for the manufacturer.

Accordingly, it would be desirable to replace the asbestos fibers in bituminous compositions of the type mentioned above with other materials which would provide a satisfactory product without the health hazards associated with the manufacture of asbestos containing products. Unfortunately, this apparently cannot be achieved satisfactorily with the use of other fibers or particulate fillers previously suggested for use in such formulations.

SUMMARY OF THE INVENTION

It is therefore, an object of the invention to provide a satisfactory asbestos-free bituminous composition for use in various roofing applications including caulking, flashing, cementing, waterproofing, etc.

In accordance with the invention, an asbestos-free bituminous composition is provided which comprises:
 (a) asphalt cutback;
 (b) between about 1 and about 3 wt% based on total composition of high-structure carbon black;
 (c) between about 1 and about 25 wt% based on total composition of expanded perlite; and
 (d) between about 0.5 and about 5 wt% based on total composition of water, said asphalt cutback comprising:
  (i) between about 50 and about 90 wt% asphalt having a ring and ball softening point between about 80 and about 240° F. and a penetration at 77° F. between about 5 and about 200 decimillimeters (dmm) as measured in accordance with and
  (ii) between about 10 and about 50 wt% solvent for said asphalt.

In preferred embodiments, the carbon black has a dibutyl phthalate absorption value of at least about 200 cc/100 g and the composition also contains between about 15 and about 50 wt% additional particulate filler with the optional addition of another 0.5–5 wt% fiber filler.

DETAILED DESCRIPTION OF THE INVENTION

As mentioned above, the bituminous composition of the invention is an asbestos-free composition comprising high structure carbon black, asphalt cutback, crushed perlite and water.

Asphalt suitable for use in material of the invention may be any of the asphalts normally found suitable for roofing purposes provided the necessary physical characteristics are met. Suitable asphalts may for instance be natural asphalt or may be asphalt obtained as a residue in petroleum or coal tar refining or from tar, sand or shale, etc.

The solvent used in forming the asphalt cutback used in the invention is conveniently any of the solvents normally used for asphalt cutback with mineral spirits being preferred. Mineral spirits is generally considered to include hydrocarbon solvent boiling within the range of 150° to 190° F. and having a closed flashpoint over 78° F. Other suitable solvents include for instance, Stoddard solvent, cutting naphtha, etc. While the amount of solvent in the asphalt cutback may be broadly within the range given above, it will be understood that the amount of solvent used in a particular composition will depend, at least in part, upon the particular solvent and asphalt used as well as the temperature at which the composition of the invention is to be used. If desired, a portion of the solvent content of the asphalt cutback may be added during blending of the composition of the invention rather than during manufacture of the asphalt cutback.

Carbon black suitable for use in compositions of the invention includes any high structure carbon black with carbon black having dibutyl phthalate absorption value of at least about 200 cc per 100 grams of carbon black being preferred. Carbon blacks with dibutyl phthalate absorption values between about 200 and about 300 cc per 100 grams carbon black are especially preferred. Suitable carbon black may be prepared by any of the usual methods of manufacturing carbon black. Such methods include thermal decomposition of hydrocarbons to produce furnace black, exothermal decomposition of acetylene to produce acetylene black, etc. Specific techniques for producing high structure blacks are well known to those skilled in the manufacture of carbon black. High structure carbon black is used in compositions of the invention in amounts between about 1 and about 3% by weight based on total compositon.

Expanded perlite suitable for use in the invention may be of any suitable particle size with particle sizes in the range of between about 1 and about 600 microns being preferred. Particle sizes averaging between about 2 and about 20 microns are especially preferred. Expanded perlite of a suitable size may be obtained by expanding perlite in a conventional manner and then crushing the expanded perlite to the desired size range either in a separate operation or as part of the blending of the components of the composition of the invention. Alternatively, perlite may be ground to appropriately fine size prior to expansion so that crushing of the expanded perlite is not necessary. Expanded perlite used in the compositions of the invention normally has a specific gravity of about 2 to 3, with a specific gravity of about 2.35 being most common and is available commercially in the form of expanded perlite having dry, loose bulk densities between about 2 and about 12 lbs. per cubic foot.

The term "perlite" as used herein is intended to apply to volcanic glass of rhyolitic composition, containing small amounts of combined water and characterized by a perlitic structure, i.e., a system of concentric, spheroidal cracks. The term is also intended to apply to other glassy rock with the capacity to expand greatly on heating. The material obtained by heating either type of rock until it expands suddenly is referred to herein as "expanded perlite."

An essential ingredient of compositions of the invention is water in amounts of between about 0.5 and about 5 wt% of the composition. Such water may be present adsorbed on the surfaces of one or more of the other ingredients of the invention or may be added during the blending of the composition. Compositions with less than the specified minimum amount of water tend to flow too readily at elevated temperatures such as standard test temperatures of 140° F. and tend to settle too readily, while compositions containing excessive amounts of water tend to freeze during outdoor storage or use at low temperatures such as below 32° F.

Even though replacement of asbestos by other fibers in bituminous compositions of the type contemplated herein has not proven satisfactory, it has been found possible by use of highly structured carbon black, crushed perlite and water as described herein, to produce satisfactory substitute bituminous compositions which are substantially free of asbestos. By "asbestos-free," "substantially free of asbestos," etc., are meant compositions containing either no asbestos or at most very small amounts such as up to about 1 wt% asbestos fiber. Complete absence of any asbestos fiber is preferred.

In a preferred embodiment, the composition of the invention also includes between about 15 and about 50 wt% additional particulate filler. Suitable additional fillers include particulate fillers of the type generally considered suitable for bituminous compositions. Such fillers preferably hve particle sizes in the general range of between about 0.02 and about 600.0 microns and include for instance limestone, perlite fines, glass microspheres, sand, stone dust, slate powder, low or medium structure carbon black, alumina, etc.

In addition to the particulate filler mentioned above, additional amounts between about 0.5 and about 5% by weight based on total composition of fibers other than asbestos may be used and are frequently preferred. Addition of fiber filler to compositions of the invention improves the weathering performance of such compositions when applied as asphaltic cements and coatings. Inorganic fiber fillers other than asbestos are preferred for this purpose. Suitable fibers for this purpose include for instance glass fibers, cellulosic fibers such as newsprint, cotton, polyesters, polyamides (e.g., nylon), polyolefins (e.g., polypropylene or polyethylene) etc. When used, glass fibers are preferably at least 3 microns in diameter to avoid the suspected carcinogenic potential of glass fibers of less than 3 micron diameter.

In addition to ingredients of compositions of the invention discussed above, such compositions may also contain other ingredients such as surfactants, elastomers, (e.g., butyl rubber) etc., especially those which are conventional in similar products. Where present, such extraneous ingredients preferably comprise less than about 10 wt% of the composition.

While the various mechanisms by which high structure carbon black enhances asphaltic material to provide suitable compositions of the invention are not completely understood, it is believed that the high structure carbon black serves several functions. For instance, the high structure carbon black is believed to absorb asphaltic oils and solvents for control of viscosity. Further, when properly formulated, there is very little, if any, settling or separation of the liquid or solid phases of compositions of the invention. The high structure carbon black also serves to provide body to the compositions of the invention for ease of application by troweling, etc. The high structure black also provides reinforcement structure to the composition before, during and after application to roof structures. This factor is essential with increasing material temperature to resist flow during and after application. Bituminous compositions of the invention are generally smooth and uniform and readily applicable with trowels over a temperature range of about 50° F. to about 125° F. Further, in most, if not all respects, compositions of the invention provide performance characteristics at least as good as the characteristics of conventional asbestos-containing bituminous compositions.

Compositions of the invention may be formed in any suitable manner with conventional mixing in the manner normally used for preparation of asphaltic roofing compositions being preferred. Relatively low shear mixing equipment such as a Ross Planetary Mixer, conventional single or double paddle mixers with thick blades operating at relatively low speeds (e.g., 40 to 90 rpm) are for instance suitable. Mixing temperatures frequently range between about 60° and about 150° F. and mixing times between about 20 and about 45 minutes. In general, high shear mixing for prolonged periods of time should be avoided to avoid breakdown of the carbon black structure into distinct particles. Substantial breakdown of the carbon black during mixing results in dispersion of the carbon black into distinct particles, thus destroying the high structure characteristics of the black and rendering it unsuitable for the compositions of the invention. As mentioned above, carbon black incorporated in compositions of the invention must be high structure carbon black, preferably with dibutyl phthalate absorption values in excess of 200 cc per 100 grams carbon black.

The folowing examples are intended to illustrate the invention without limiting the scope thereof.

EXAMPLE I

A bituminous cement having the following composition was prepared by blending the ingredients in a Ross low shear planetary mixer.

| Ingredient | Wt% |
| --- | --- |
| Asphalt Cutback (70 Wt% Asphalt-30 Wt% mineral spirit solvent) | 61.0 |
| Surfactant | 0.3 |
| Fiber Glass Filler (average diameter 3-6 microns-average length 1/4") | 1.0 |
| High Structure Carbon Black | 1.5 |
| Mineral Spirit Solvent | 6.0 |
| Limestone Filler | 17.6 |
| Water | 0.6 |
| Crushed Expanded Perlite (average particle size 3-5 microns) | 12.0 |

This composition was prepared by placing the asphalt cutback at room temperature in the mixer. The surfactant was then added, the mixer was turned on and the fiberglass filler was added. The mixer was then turned off in order to reduce dust while the carbon black was added. The mixer was then turned on until the carbon black was completely wetted and incorporated in the mix. The additional mineral spirit solvent was then added to lower the viscosity of the mix for cold weather application. Next the limestone filler was added, then completely wetted after which the water was added and dispersed into the mix. Finally the crushed expanded perlite was added while continuing mixing. Overall mixing time was about 30 minutes.

The base asphalt used in this example was petroleum asphalt derived from Mid-Continent crude oil having a ring and ball softening point of about 130° F. and a penetration at 77° F. of 45 dmm. The carbon black had a dibutyl phthalate absorption of about 240 cc per 100 grams of carbon black with a surface area as determined by nitrogen adsorption of 49 square meters per gram of carbon black and a stiff paste oil absorption of 3–4 cc per gram of carbon black. The Clarvoe consistency (77° F., brass rod plus 100 grams load) was less than 1.0 second.

EXAMPLE II

Another suitable composition of the invention has the following ingredients:

| Ingredient | Wt% |
|---|---|
| Asphalt Cutback (50% Wt% asphalt-50 wt% Cutting Naphtha Solvent) | 54 |
| High Structure Carbon Black | 3 |
| Expanded Perlite | 6 |
| Water | 4 |
| Glass Fiber Filler | 3 |
| Limestone Filler | 30 |

EXAMPLE III

Another suitable composition of the invention contains the following ingredients:

| Ingredient | Wt% |
|---|---|
| Asphalt Cutback (90 Wt% Asphalt-10 Wt% Mineral Spirit Solvent) | 75 |
| High Structure Carbon Black | 1 |
| Expanded Perlite | 2 |
| Water | 2 |
| Cotton | 2 |
| Glass Microspheres | 15 |

EXAMPLE IV

Another suitable composition of the invention has the following ingredients:

| Ingredient | Wt% |
|---|---|
| Asphalt Cutback (80 Wt% Asphalt-20 Wt% Cutting Naphtha Solvent) | 75 |
| High Structure Carbon Black | 2 |
| Expanded Perlite | 20 |
| Water | 3 |

EXAMPLE V

Another suitable composition of the invention has the following ingredients:

| Ingredient | Wt % |
|---|---|
| Asphalt Cutback (700% Asphalt-30% Mineral Spirits Solvent | 94 |
| High Structure Carbon Black | 1 |
| Expanded Perlite | 4 |
| Water | 1 |

While the invention has been described above with respect to certain embodiments thereof, it will be understood by those skilled in the art that various changes and modifications may be made without departing from the spirit and scope of the invention.

What is claimed is:

1. An asbestos-free bituminous composition comprising:
    (a) asphalt cutback;
    (b) between about 1 and about 3 wt% based on total composition of high-structure carbon black having a dibutyl phthalate absorption value of at least about 200 cc per 100 grams of carbon black;
    (c) between 1 and about 25 wt% based on total composition of crushed perlite; and
    (d) between about 0.5 and about 5 wt% based on total composition of water, said asphalt cutback comprising;
        (i) between about 50 and about 90 wt% asphalt having a ring and ball softening point between about 80 and about 240° F. and a penetration at 77° F. between about 5 and about 200 decimillimeters; and
        (ii) between about 10 and about 50 wt% solvent for said asphalt.

2. Composition according to claim 1 wherein the crushed perlite has an average particle size in the range between about 1 and about 600 microns.

3. Composition according to claim 2 wherein the composition also contains between about 15 and about 50 wt% additional particulate filler having an average particle size between about 0.02 and about 600 microns.

4. Composition according to claim 3 wherein the composition also includes between about 0.5 and about 5 wt% fiber filler.

5. Composition according to claim 3 wherein the additional particulate filler is limestone and the composition also includes between about 0.5 and about 5 wt% glass fibers.

* * * * *